United States Patent [19]
Owens

[11] Patent Number: 5,518,263
[45] Date of Patent: May 21, 1996

[54] VEHICLE/TRAILER HITCH ALIGNMENT SYSTEM

[76] Inventor: Robert K. Owens, Rt. 2, Box 842, Denton, N.C. 27239

[21] Appl. No.: 556,632

[22] Filed: Nov. 13, 1995

Related U.S. Application Data

[63] Continuation of Ser. No. 234,559, Apr. 28, 1994, abandoned.

[51] Int. Cl.$^6$ ........................................................ B60D 1/36
[52] U.S. Cl. ............................................. 280/477; 33/264
[58] Field of Search ............................... 280/477, 478.1, 280/511; 33/264, DIG. 1; 340/431

[56] References Cited

U.S. PATENT DOCUMENTS

| | | | |
|---|---|---|---|
| 3,363,318 | 1/1968 | Folkins et al. | 280/477 X |
| 3,774,149 | 11/1973 | Bennett | 280/477 X |
| 3,889,384 | 6/1975 | White | 280/477 X |
| 3,901,536 | 8/1975 | Black | 280/477 |
| 3,918,746 | 11/1975 | Lehtisaari | 280/477 |
| 4,192,526 | 3/1980 | Myers | 280/477 |
| 4,583,481 | 4/1986 | Garrison | 33/264 X |
| 4,666,176 | 5/1987 | Sand | 280/477 |
| 4,708,359 | 11/1987 | Davenport | 280/477 |
| 4,905,376 | 3/1990 | Neeley | 280/477 X |
| 5,180,182 | 1/1993 | Haworth | 280/477 |
| 5,290,056 | 1/1994 | Fath, IV | 33/264 X |

*Primary Examiner*—Eric D. Culbreth
*Assistant Examiner*—F. Zeender

[57] ABSTRACT

An alignment system for hitching a towing vehicle to a trailer is provided to increase the convenience and ease to the vehicle driver. A vertical trailer guide is temporarily joined to the tongue of the trailer proximate the hitch, and a guide receptor is affixed to the rear of the towing vehicle. A color indicator signals the driver when the vehicle and trailer are properly aligned, whereupon the driver can then manually complete the hitching operation.

18 Claims, 4 Drawing Sheets

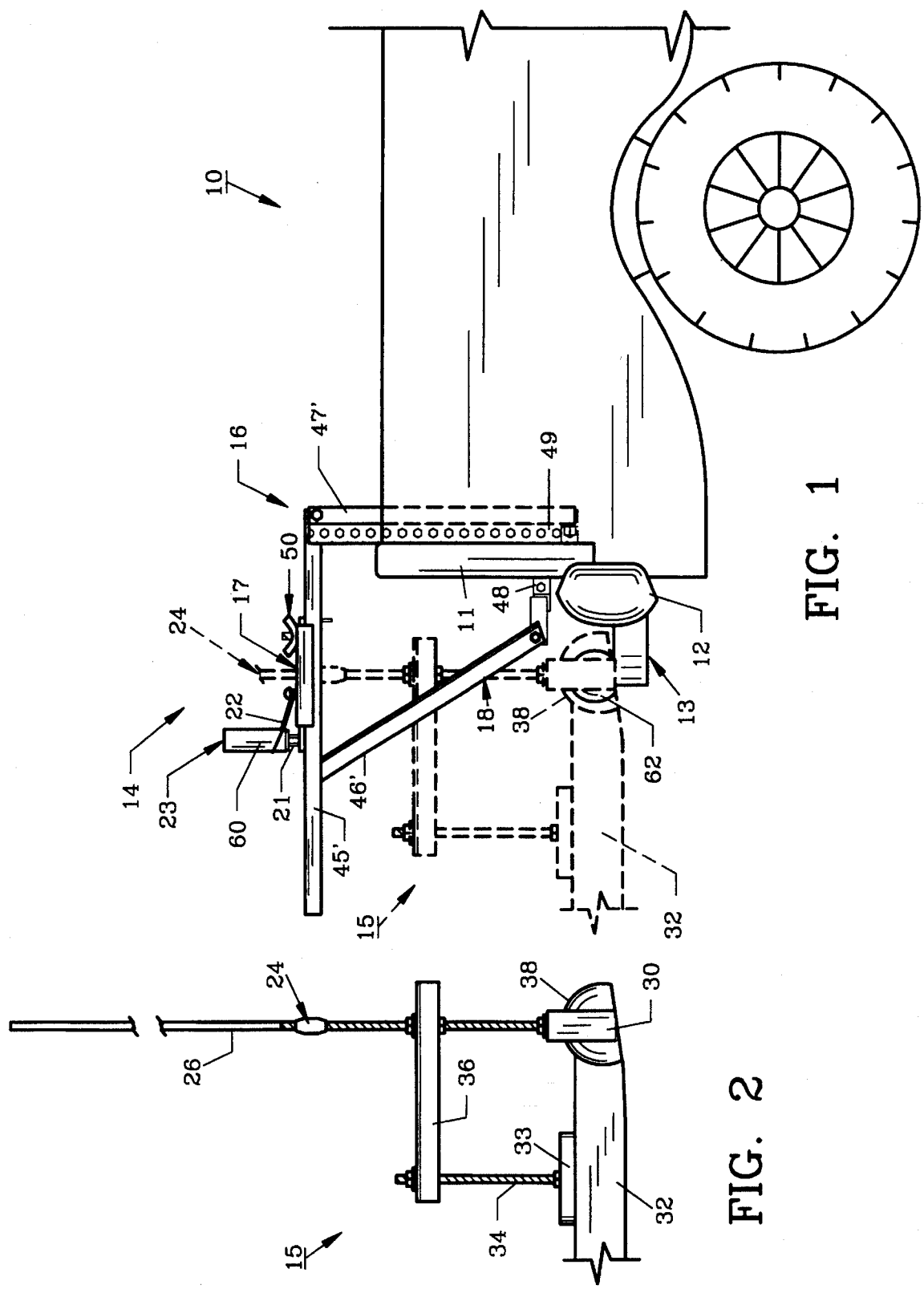

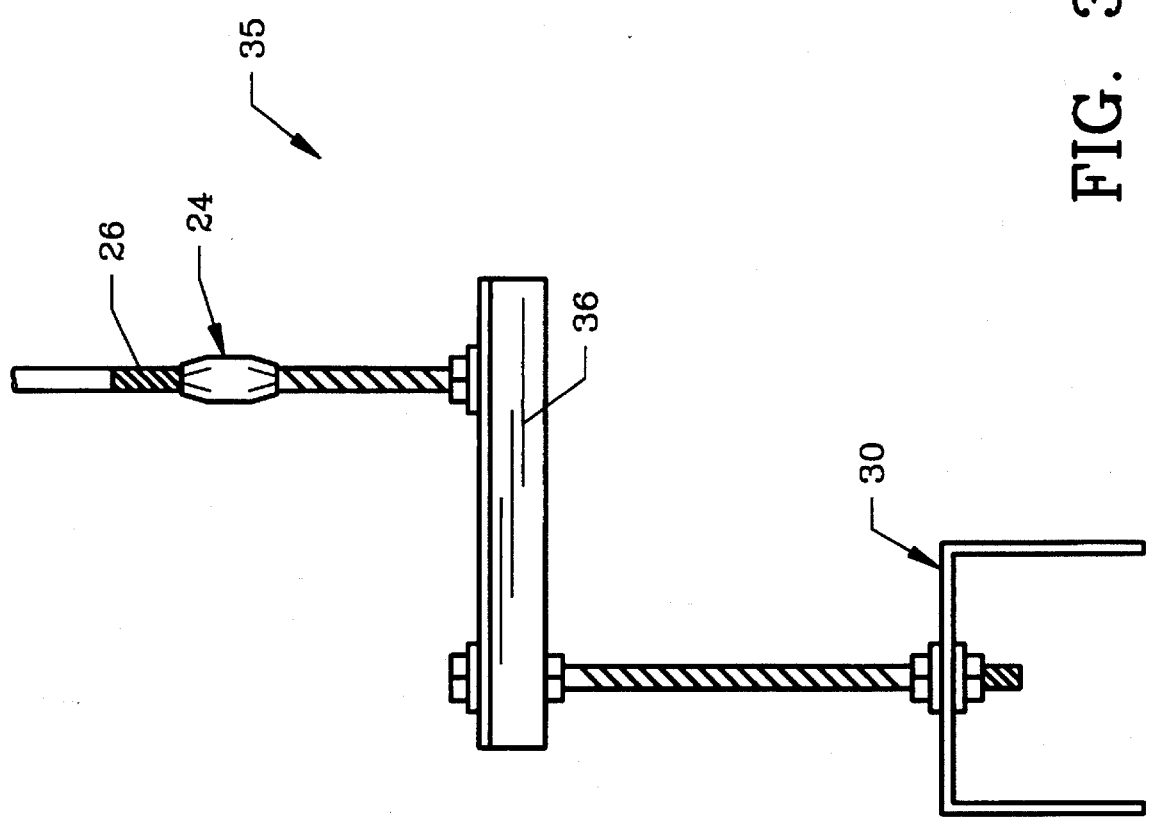

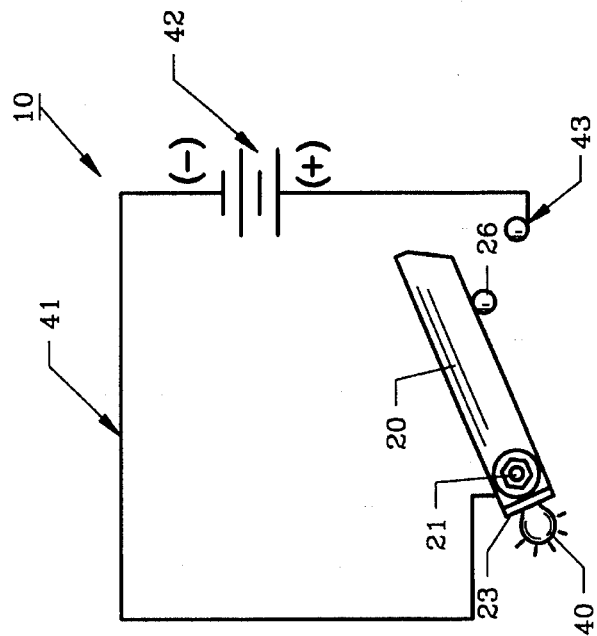
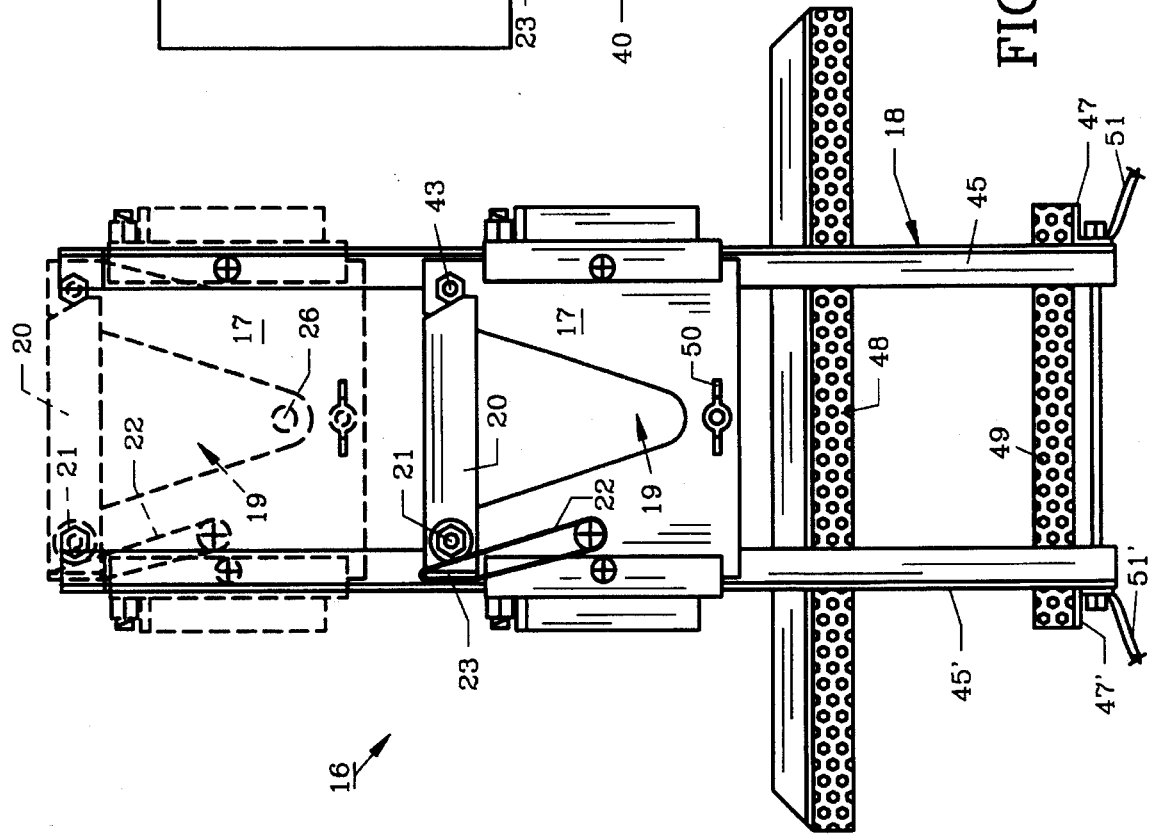

5,518,263

VEHICLE/TRAILER HITCH ALIGNMENT SYSTEM

This is a continuation of application Ser. No. 08/234,559 filed 28 April 1994, now abandoned.

BACKGROUND OF THE INVENTION

1. Field Of The Invention

The invention herein pertains to a system for aligning a trailer with a towing vehicle and particularly pertains to small trailers that may be pulled with standard pickup trucks.

2. Description Of The Related Art And Objectives Of The Invention

As is well known by boat owners who tow their boats on a trailer or campers with a pickup truck, van or other vehicle, it is extremely difficult and inconvenient to align and connect the trailer hitch to the vehicle ball hitch. When towing with a pickup truck, a driver has to approximate the distance between the vehicle ball hitch and the trailer hitch and directly aim the rear of the vehicle for alignment. As the vehicle ball hitch is generally below the line of sight from the rear window, an estimate within one to two feet is considered good. The driver has to manipulate the trailer hitch onto the vehicle ball hitch, which can be extremely difficult and may require a second person to help or else require numerous attempts at backing. Also, at times, damage has occurred due to the driver being overly aggressive while backing. At other times, on uneven terrain, a driver must back his vehicle six times or more to achieve close alignment. In early morning or late evening hours, when light is minimal, the aligning process can be even more challenging. Experienced drivers are thus often faced with the inconvenience and physical tasks of aligning the towing vehicle with the trailer to provide a hitch connection.

While others have attempted to provide alignment devices in the past, none today have succeeded in providing a simple, inexpensive system which will make the alignment and hitching operation simple and convenient.

It is therefore an objective of the present invention to provide a vehicle/trailer alignment system which facilitates coupling a towing vehicle to a trailer.

It is yet another objective of the present invention to provide a method for aligning a trailer hitch with a vehicle hitch on uneven terrain, at any angle during bad weather or in like conditions.

It is also an objective of the present invention to provide a vehicle/trailer hitch alignment system which includes a trailer guide and a guide receptor having a movable gate.

It is yet another objective of the present invention to provide a vehicle/trailer alignment system having a guide receptor which includes a visual indicator.

It is also an objective of the present invention to provide a vehicle/trailer alignment system which includes a guide receptor movable along a mounting frame.

It is yet another objective of the present invention to provide a vehicle/trailer alignment system which includes a light bulb to provide an indication of correct alignment at night or in low lighting conditions.

Various other objectives and advantages of the present invention will become apparent to those skilled in the art as a more detailed presentation is set forth below.

SUMMARY OF THE INVENTION

The aforesaid and other objectives are realized by providing a vehicle/trailer alignment system which includes a trailer guide for attachment to a trailer hitch and a guide receptor which is positioned above the vertical ball hitch on a vehicle ball hitch. The guide receptor includes a swingable gate with a visual indicator whereby, for example, the driver of a pickup truck can direct the vehicle backwardly to position the vehicle ball hitch proximate the trailer hitch for connection therewith. As the vehicle is driven rearwardly, upon correct alignment and contact with the vertical member of the trailer guide, the gate swings open allowing the vertical member to enter the guide receptor. Once the vertical member is completely within the guide receptor, the gate then swings by the vertical member, and, by a colored or other visual indicator, the driver can determine that the vehicle ball hitch is proximate the trailer hitch. The driver can then connect the trailer hitch to the vertical ball hitch, remove the trailer guide and proceed to tow a camper or a trailer, which may hold a boat or the like.

BRIEF DESCRIPTION OF THE DRAWINGS

FIG. 1 demonstrates a partial side view of the rear of a pickup truck, as may be used with the invention, having a trailer guide receptor affixed thereto;

FIG. 2 illustrates a trailer hitch with one embodiment of a trailer guide attached for coupling the pickup truck as seen in FIG. 1;

FIG. 3 illustrates another embodiment of a trailer guide;

FIG. 4 presents an enlarged top plan view of the guide receptor, as shown in FIG. 1, removed from the pickup truck;

FIG. 7 illustrates in schematic fashion the movable gate of the guide receptor with an electric visual indicator.

DETAILED DESCRIPTION OF THE DRAWINGS AND OPERATION OF THE INVENTION

For a more complete understanding of the invention, turning now to the drawings, FIG. 1 shows a rear side view of a portion of a conventional pickup truck 10 having a tailgate 11, bumper 12 and conventional vehicle ball hitch 13 mounted thereto.

Figure 5:
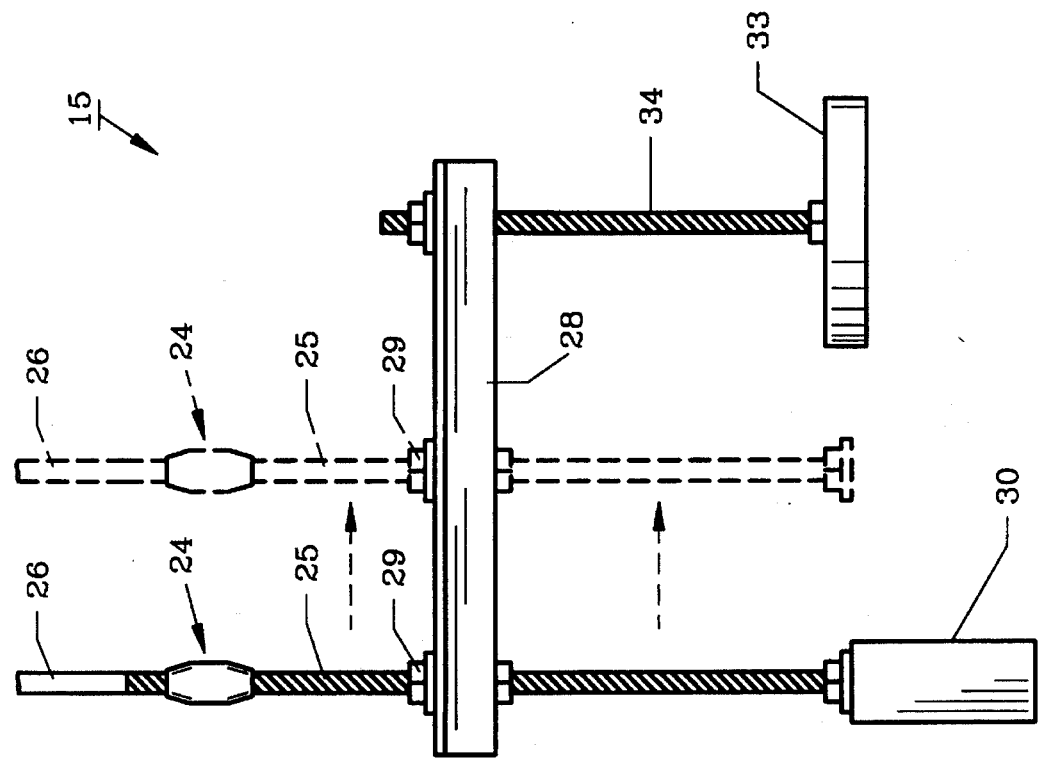
FIG. 5 pictures an enlarged view of a trailer guide demonstrating the adjustability of the vertical member.
Figure 6:
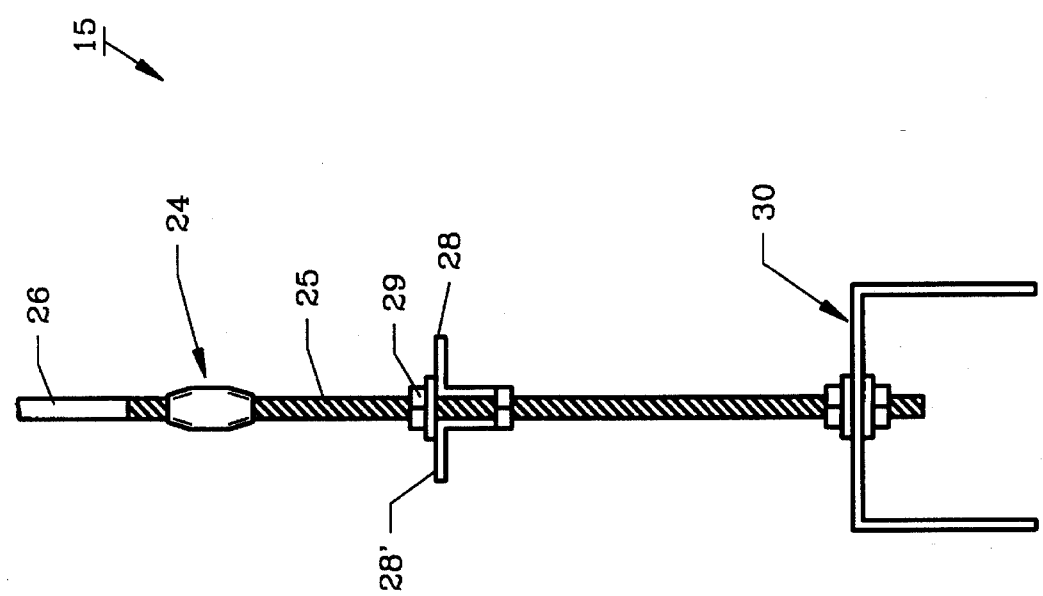
FIG. 6 shows a front elevational view of the trailer guide shown in FIG. 5.

The preferred vehicle/trailer hitch alignment system 14, as shown in FIG. 1, includes trailer guide 15, shown in imaginary fashion, and trailer guide receptor 16, which is affixed to the rear of pickup truck 10. Trailer guide receptor 16 includes slidable guide receptor 17 as seen more clearly in FIG. 4, and guide receptor mounting frame 18. Slidable guide receptor 17 is planar and includes a V-shaped notch 19, as shown in FIG. 4, which is closed at the upper or forward end by swingable gate 20, which is pivotal around axle 21. Guide receptor 17 can be adjusted by releasing wing nut 50. Resilient band 22, which may be elastic or rubber, applies tension to vertical upright 23, shown more clearly in FIG. 1, to keep gate 20 closed. As shown in FIGS. 2, 5 and 6, trailer guide 15 includes vertical guide member 24 which may consist of a threaded lower portion 25 and a cylindrical upper portion 26. As seen in FIGS. 5 and 6, trailer guide 15 includes a pair of horizontally extending angle members 28, 28', whereby vertical guide member 24 can be loosened by turning nut 29 and then slid along angle members 28, 28' for adjustment purposes. As shown in FIG. 5, vertical guide member 24 can be moved to an infinite number of positions.

Inverted U-shaped bracket 30 is positioned over trailer tongue 32, and magnetic member 33, which consists of a circular permanent magnet, temporarily secures trailer guide 15 during the alignment process. Magnetic member 33 is vertically adjustable through threaded member 34. After use, trailer guide 15 can be quickly removed and stored for future use.

An alternate embodiment of a trailer guide 35 is shown in FIG. 3 and includes horizontal member 36, which provides an offset to trailer guide 35. Horizontal offset member 36 is useful, for example, when the towing vehicle is a van, car or truck with an obstructed direct center view. The offset allows the vertical, cylindrical upper portion 26 of vertical guide member 24 to be seen during the alignment process.

A visual indicator is extremely helpful in determining when cylindrical upper portion 26 is correctly aligned to open swingable gate 20 since trailer guide 15 may be seven to eleven feet from the driver. To assist in this operation, visual indicator 60 such as a red paint, a fluorescent coating or the like is applied to vertical upright 23, as shown in FIG. 1. Thus, as gate 20 swings open, vertical upright 23 turns toward the towing vehicle and can be easily observed by the driver through the rear window. Once cylindrical upper portion 26 is deeply within V-shaped notch 19, resilient band 22 rotates gate 20 back to its original, closed position, as shown in FIG. 4. Another embodiment of a visual indicator is shown in FIG. 7 whereby vertical upright 23, which is connected to gate 20, includes light bulb 40 and electrical circuitry 41. Electrical circuitry 41 may be powered by a small battery 42 or may be joined directly to the electrical circuitry of pickup truck 10. In either event, bulb 40 will remain lit until trailer guide upper portion 26, which may be approximately thirty inches in length and three-eights inches in diameter, contacts gate 20, whereupon gate 20 will open, breaking electrical contact with post 43 and cause bulb 40 to turn off. This embodiment is particularly useful for nighttime hitching or in other low natural light conditions. As cylindrical upper portion 26 progresses deeper into V-shaped notch 19, gate 20 will slide past upper portion 26 and will again make contact with post 43, turning light 40 on. The driver is then assured that vehicle hitch ball 62 and trailer ball socket 38 are in close proximity and properly aligned.

As shown in FIG. 4, trailer guide receptor 16 includes mounting frame 18. Mounting frame 18 comprises a pair of parallel support members 45, 45'. In FIG. 1, pivotal struts 46 (not seen), 46' provide vertical support for parallel members 45, 45' respectively as do rear vertical struts 47, 47'. Foam rubber 48 and other foam rubber 49 provide protection to prevent scratching of the vehicle body. As would be understood, vertical struts 47, 47' can be reversed with foam rubber 49 turned rearwardly, for example, when mounting trailer guide receptor 16 to the back of a van or panel truck (not shown). Straps 51, 51', as shown in FIG. 4, may have a buckle for adjustment purposes and can be attached and are used to hold trailer guide receptor 16 on the back of a van or panel truck as needed.

The preferred method consists of attaching the vehicle/trailer hitch alignment system by positioning trailer guide 15 on trailer tongue 32 and affixing trailer guide receptor 16 to the towing vehicle. The driver of the towing vehicle then views vertical guide member 24 through the rear window or the like and backs the vehicle towards the trailer. If alignment is correct, vertical guide member 24 contacts swingable gate 20 of guide receptor 17 and penetrates into V-shaped notch 19 thereof. Visual indicator 60 becomes apparent once swingable gate 20 begins to open, and, after it opens fully, allowing vertical guide member 24 to slip beyond gate 20, gate 20 then closes as a result of the force applied by resilient band 22. As gate 20 closes, visual indicator 60 which may be a color on vertical upright 23, is no longer seen; trailer socket 38 is then contiguous to vehicle hitch ball 62.

The illustrations and examples provided herein are for explanatory purposes and are not intended to limit the scope of the appended claims.

I claim:

1. A vehicle/trailer hitch alignment system for use with a vehicle having a vertical wall for mounting purposes, said system comprising:

(a) a trailer guide for attachment to a trailer, said trailer guide comprising a vertical member;

(b) a mounting frame for attachment to said vehicle vertical wall, said mounting frame comprising a first vertical strut for engagement with said vehicle vertical wall; and (c) a guide receptor, said guide receptor attached to said mounting frame, said guide receptor defining an open notch for reception of said trailer guide, a gate, said gate pivotally attached to said guide receptor at the mouth of said notch, said gate movable to allow said trailer guide to pass into said notch.

2. The vehicle/trailer alignment system as claimed in claim 1, further comprising a second vertical strut, said second vertical strut attached to said mounting frame.

3. The vehicle/trailer alignment system as claimed in claim 2 wherein said vehicle vertical wall can be sandwiched between said first vertical strut and said second vertical strut.

4. The vehicle/trailer alignment system as claimed in claim 1, further comprising a visual indicator, said visual indicator attached to said gate wherein said visual indicator is visible when said trailer guide enters said guide receptor.

5. The vehicle/trailer hitch alignment system of claim 4 wherein said visual indicator comprises a colored indicator.

6. The vehicle/trailer hitch alignment system of claim 4 wherein said visual indicator comprises an electrical indicator.

7. The vehicle/trailer alignment system as claimed in claim 1 wherein said guide receptor is adjustably movable along said mounting frame.

8. A vehicle/trailer alignment system for use with a vehicle having a vertical wall, said system comprising:

(a) a trailer guide for attachment to a trailer, said trailer guide including a vertical guide member;

(b) a mounting frame, said mounting frame comprising a front mounting member and a rear mounting member; and (c) a trailer guide receptor, said guide receptor affixed to said mounting frame, said mounting frame for attachment to said vehicle vertical wall, said vehicle for coupling with and for towing said trailer, said guide receptor defining an open V-shaped notch for reception of said trailer guide, a gate, said gate pivotally attached to said guide receptor at the mouth of said notch, said gate swingable from a closed to an open position to allow said trailer guide to enter said open V-shaped notch when said vehicle is properly aligned with said trailer.

9. The vehicle/trailer alignment system as claimed in claim 8 wherein said vehicle vertical wall can be sandwiched between said front mounting member and said rear mounting member.

10. The vehicle/trailer alignment system as claimed in claim 8, further comprising a visual indicator, said visual indicator attached to said gate wherein said visual indicator is visible when said trailer guide enters said guide receptor.

11. The vehicle/trailer hitch alignment system of claim 10 wherein said visual indicator comprises a colored indicator.

12. The vehicle/trailer hitch alignment system of claim 10 wherein said visual indicator comprises an electrical indicator.

13. A vehicle/trailer alignment system for use with a vehicle having a vertical wall, said system comprising:

(a) a trailer guide for attachment to a trailer, said trailer guide comprising a vertical guide member;

(b) a mounting frame, said mounting frame comprising a front mounting member and a rear mounting member; and (c) a trailer guide receptor, said guide receptor affixed to said mounting frame, said mounting frame for attachment to said vehicle vertical wall, said vehicle for coupling with and for towing said trailer, said guide receptor defining an open V-shaped notch for reception of said trailer guide, a one-way gate, said one-way gate pivotally attached to said guide receptor at the mouth of said notch, said one-way gate swingable from a closed to an open position to allow said trailer guide to enter said V-shaped notch when said vehicle is properly aligned with said trailer and to prevent exit of said trailer guide therefrom.

14. The vehicle/trailer alignment system as claimed in claim 13 wherein said vehicle vertical wall can be sandwiched between said front mounting member and said rear mounting member.

15. The vehicle/trailer hitch alignment system of claim 13, further comprising a visual indicator, said visual indicator attached to said one-way gate.

16. The vehicle/trailer hitch alignment system of claim 15 wherein said visual indicator comprises a colored indicator.

17. The vehicle/trailer hitch alignment system of claim 15 wherein said visual indicator comprises an electrical indicator.

18. The vehicle/trailer hitch alignment system of claim 15 wherein said vertical guide member comprises an offset.

* * * * *